United States Patent [19]
Alhamad

[11] Patent Number: 5,788,110
[45] Date of Patent: Aug. 4, 1998

[54] ARTICLES AND METHODS FOR PROTECTION AGAINST FOCUSED BEAMS OF RADIANT ENERGY

[76] Inventor: Shaikh Ghaleb Mohammad Yassin Alhamad, P.O. Box 31590, Riyadh, 11418, Saudi Arabia

[21] Appl. No.: 470,254

[22] Filed: Jun. 6, 1995

Related U.S. Application Data

[63] Continuation-in-part of Ser. No. 414,106, Mar. 31, 1995, abandoned, which is a continuation-in-part of Ser. No. 806,901, Dec. 12, 1991, Pat. No. 5,402,852, which is a division of Ser. No. 674,277, Mar. 19, 1991, Pat. No. 5,097,907, which is a division of Ser. No. 417,696, Oct. 5, 1989, Pat. No. 5,001,017, which is a division of Ser. No. 280,317, Dec. 6, 1988, abandoned.

[51] Int. Cl.$^6$ .................. B65D 1/04; A02C 3/02
[52] U.S. Cl. .................. 220/450; 428/573; 428/577; 428/592
[58] Field of Search .................. 220/450; 428/573, 428/577, 592

[56] References Cited

U.S. PATENT DOCUMENTS

| | | | |
|---|---|---|---|
| 1,671,650 | 5/1928 | Newman et al. | |
| 3,162,231 | 12/1964 | Emerson | 153/2 |
| 3,349,953 | 10/1967 | Conaway et al. | 220/85 |
| 3,356,256 | 12/1967 | Szego | 220/88 |
| 3,687,329 | 8/1972 | Baum | 220/26 R |
| 4,149,649 | 4/1979 | Szego | 220/88 A |
| 4,249,669 | 2/1981 | Szego | 220/216 |
| 4,265,317 | 5/1981 | Knecht | 169/50 |
| 4,323,620 | 4/1982 | Zwabuchi et al. | 220/450 |
| 4,361,190 | 11/1982 | Szego | 169/48 |
| 4,440,076 | 4/1984 | Lines | 428/92 |
| 4,444,821 | 4/1984 | Young et al. | 220/450 |
| 4,461,054 | 7/1984 | Schrenk | 220/88 R |
| 5,001,017 | 3/1991 | Alhamad et al. | 220/450 |
| 5,500,037 | 3/1996 | Alhamad | 220/450 |

FOREIGN PATENT DOCUMENTS

| | | |
|---|---|---|
| 256239 | 2/1988 | European Pat. Off. |
| 601374 | 11/1925 | France |
| 2440892 | 2/1980 | France |
| 2602976 | 2/1988 | France |
| 3435457 | 2/1986 | Germany |

OTHER PUBLICATIONS

John Powell, "Cutting Non-Ferous Metals", CO2 Laser Cutting, pp. 71–86, Springer–Verlag (London).

*Primary Examiner*—Joseph M. Moy
*Attorney, Agent, or Firm*—Charles E. Cates; Frank T. Barber

[57] ABSTRACT

A highly effective barrier for protecting objects against focused beams of radiant energy. The invention has special applicability in a combat environment for protecting military equipment against destruction by laser weapons, or for thwarting detection of such equipment by reflected radar waves. The barrier comprises a layer of slitted and expanded metal foil, made from a non-ferrous metal having an absorptivity less than 3% and a thermal conductivity above 100 W/m/K, interposed between the radiant energy beam and the object to be protected. The barrier layer may be multiple sheets of the slitted and expanded metal foil, or a contained layer of nested ellipsoids formed from the expanded metal sheets.

40 Claims, 2 Drawing Sheets

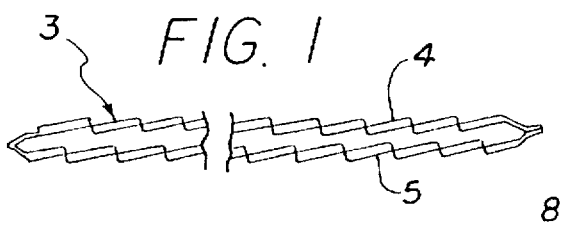
FIG. 1  FIG. 1-A
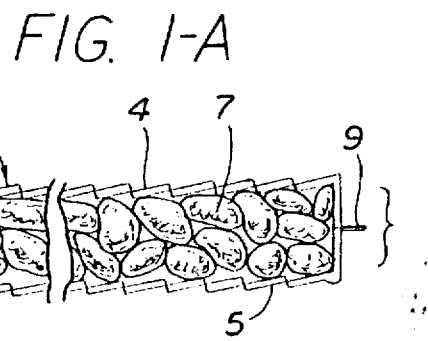
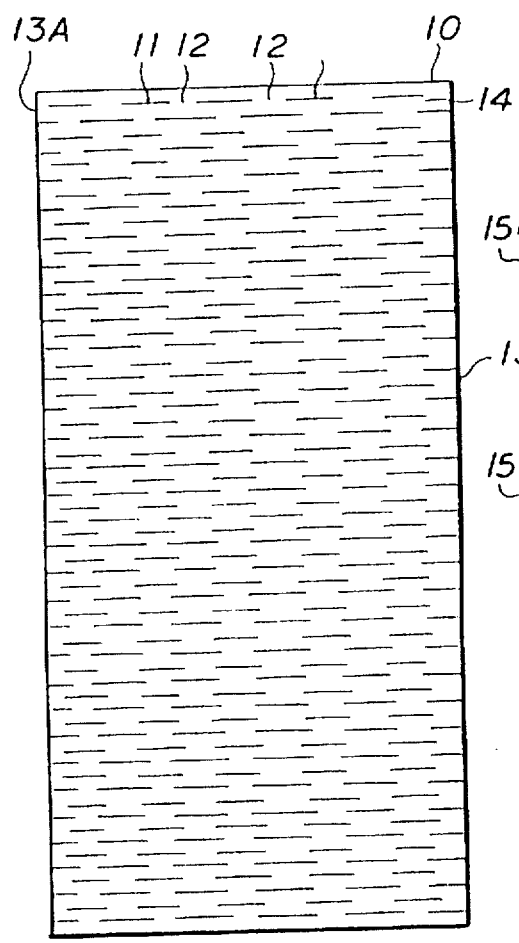
FIG. 2
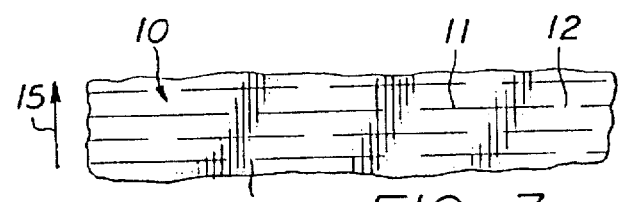
FIG. 3
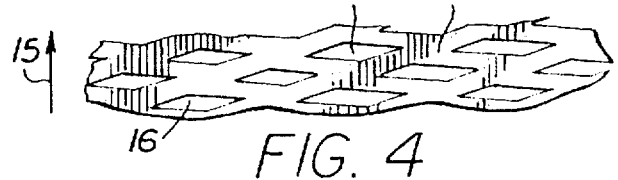
FIG. 4
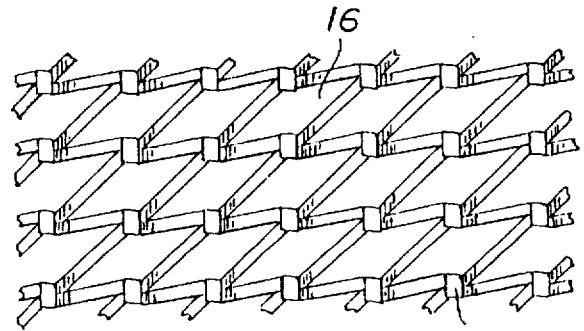
FIG. 5
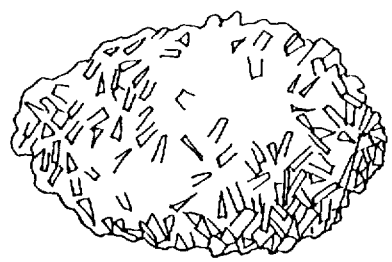
FIG. 7
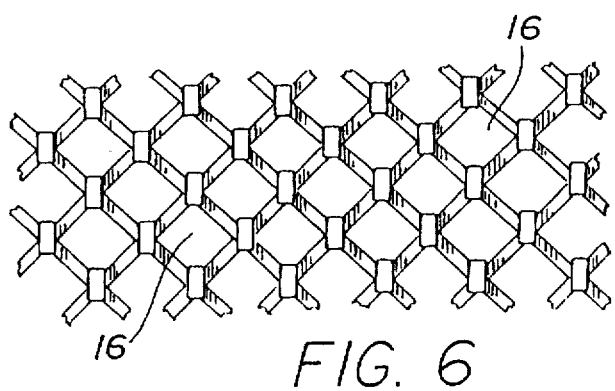
FIG. 6

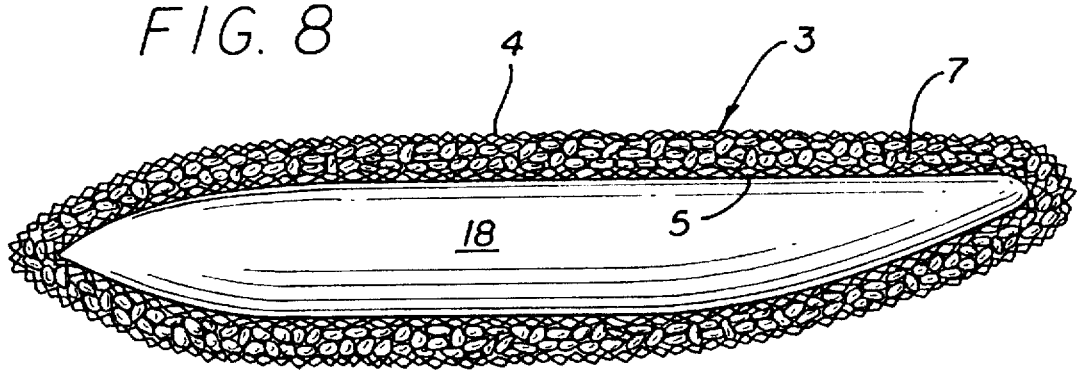
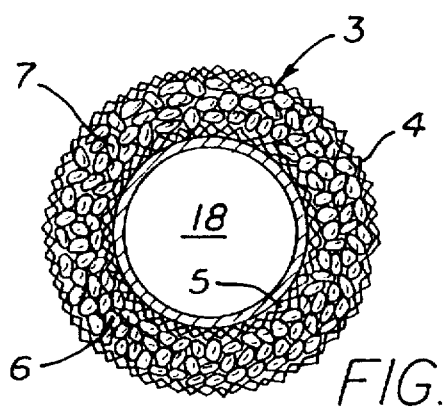
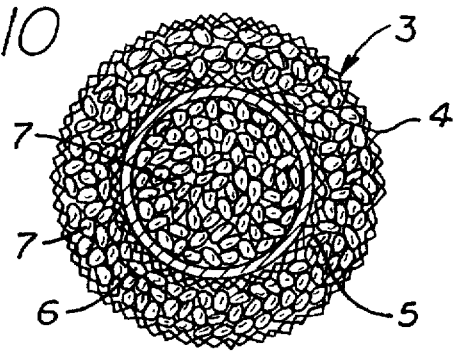
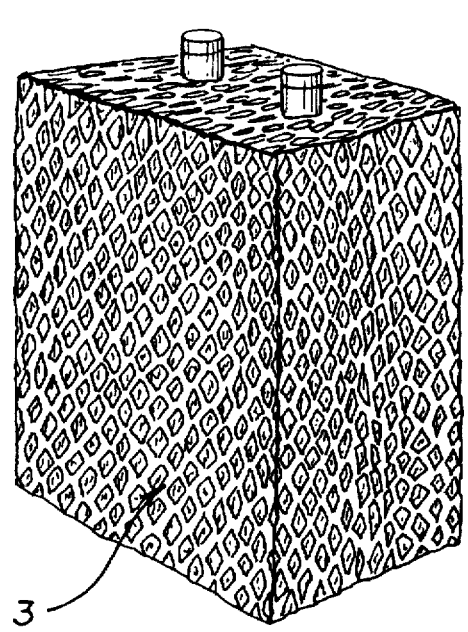
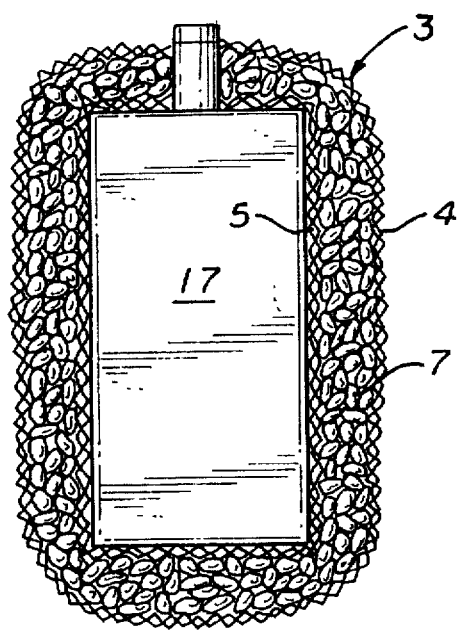

ARTICLES AND METHODS FOR PROTECTION AGAINST FOCUSED BEAMS OF RADIANT ENERGY

This application is a continuation-in-part of application Ser. No. 414,106, filed Mar. 31, 1995 (now abandoned), which is a continuation-in-part of application Ser. No. 806,901, filed Dec. 2, 1991, now U.S. Pat. No. 5,402,832, which was a division of application Ser. No. 674,277, filed Mar. 19, 1991 (now U.S. Pat. No. 5,097,907, issued Mar. 24, 1992), which was a division of application Ser. No. 417,696, filed Oct. 5, 1989 (now U.S. Pat. No. 5,001,017, issued Mar. 19, 1991), which was a division of application Ser. No. 280,317, filed Dec. 6, 1988 (now abandoned).

FIELD OF THE INVENTION

This invention relates generally to barriers or shields for the protection of objects against focused beams of radiant energy. The invention has special applicability in a combat environment for protecting military equipment against destruction by laser weapons, or for thwarting detection of such equipment by reflected radar waves.

All radiant energy exists in the form of electromagnetic waves. The various forms of radiant energy are categorized according to their characteristic wave lengths. Thus, the most important kinds of electromagnetic energy in terms of increasing wave lengths are: cosmic rays, gamma rays given off by radium, X rays, ultraviolet rays, visible light, infrared or heat waves, radio waves, and electric waves. All of these forms of radiant energy have been harnessed for use in industry, medicine, communications, warfare, and the like.

Although natural sources of radiant energy send out their electromagnetic waves in all directions, great strides have been made in refining and enhancing the power and usefulness of these energy sources by focusing the waves into unidirectional beams and concentrating the energy on a single small area to be treated. Thus, in laser technology, light waves are amplified and focused into a beam which can be brought to bear on a point which may be only one ten-thousandths of an inch wide. When the energy of the beam is concentrated on such a small area, it may produce temperatures higher than 10,000 degrees F. In this way, the laser is used to melt and vaporize many hard materials and to carry out many precision operations involving the treatment of tiny areas. The unusual characteristics of laser light make the laser a useful tool in industry, medicine, navigation and communications.

The laser also has applications in the military arena, where the intense heat of the laser beam can be used from a long distance to create holes in vehicle fuel tank walls or other vehicle components or to otherwise disable operating systems. The fuel tanks on aircraft are one of the most vulnerable areas to attack. Because of the nature of aircraft fuel, an explosive or combustible fuel-air mixture normally exists in the ullage of an aircraft fuel tank, and when the integrity of the fuel tank walls is pierced by a laser beam, the resulting fire and explosion can cause significant and often fatal structural damage not only to the fuel tank but also to the aircraft itself.

Guided missiles are a form of military weaponry which are particularly subject to interception and destruction because of the supplies of liquid or solid fuel which they carry on board for propulsion. Guided missiles of all types, including surface-to-surface, surface-to-air, air-to-air, and air-to-surface, are vulnerable to this type of laser attack. When an anti-missile device in the form of a laser beam is directed at a guided missile, particularly one with outboard fuel tanks, the piercing of the fuel tank by the laser beam causes explosion and destruction of the missile in its course, and a resultant failure of the expensive weapon.

The destructive effect of a laser beam attack on the fuel tank of a ground combat vehicle is of a different nature, but equally destructive. Although the danger of explosion on the inside of the fuel tank of a ground vehicle is lessened because of the lesser tendency of diesel fuel to produce an explosive fuel-air mixture, nevertheless many flammable materials are carried aboard ground combat vehicles, including fuel, hydraulic fluid, and ammunition. The serious damage in a ruptured land vehicle tank is the burning of pooled fuel outside the tank. When a fuel tank is ruptured by a laser beam, the contained fuel is spilled on surrounding surfaces and is then ignited by the energy of the laser beam or the surrounding hot surfaces (engine, gun breech, etc.). The burning fuel ignites surrounding displaced and stored fuel, rapidly engulfing the vehicle and its personnel in flames.

Radar technology is another area in which the usefulness of radiant energy has been enhanced by focusing electromagnetic waves into unidirectional beams. A radar device produces pulses of radio waves which are focused into a unidirectional beam, and the echo from the focused beam against a distant object is used to calculate the distance and direction of the object. Radar is thus a useful tool in many applications. It is used for traffic control and navigation in the aviation and shipping industries; for law enforcement; for weather forecasting; and for many scientific purposes, such as astronomy, oceanography, and the like.

Radar has also become a military tool of many uses. For defensive purposes, early warning radar systems help prevent surprise attacks by detecting approaching enemy aircraft or ballistic missiles. However, it is used for important offensive purposes as well. Fire control radar aims and fires guns and missiles such as rockets. Bombers with radar bombsights drop bombs on targets at night or in bad weather. Especially damaging shells or bombs are equipped with radar proximity fuses, which explode the bombs in the air near a designated target.

Concurrently with the development of military uses of focused radiant energy beams, such as laser and radar, there has been a need and an effort to develop effective defensive countermeasures.

It is an object of the present invention to provide a barrier or shield against focused beams of radiant energy.

It is another object of the invention to provide jacketed articles which are protected against the destructive forces of focused beams of radiant energy such as laser or radar.

It is a further object of the invention to provide articles, such as fuel tanks, which are protected not only against radiant beam weaponry but also against internal explosion of the fuel contained therein.

It is a further object to provide methods for use of the new barrier in the protection of structures which are otherwise subject to destruction from the destructive forces of focused beams of radiant energy.

It is another object of the invention to provide a barrier which is extremely light, durable, simple and inexpensive to manufacture, easy to assemble, and relatively maintenance-free.

Other objects and advantages of the invention will become apparent as the specification proceeds.

SUMMARY OF THE INVENTION

This invention is based on the discovery that focused beams of radiant energy, such as laser or radar, can be effectively unfocused, or scattered, when they strike a barrier comprising a layer of slitted and expanded metal foil, such as aluminum, copper or magnesium or alloys thereof. It has been found that the barrier is effective in scrambling the focused rays in such manner that the intended purpose of such rays is successfully thwarted.

The barrier of the present invention is useful in many applications for protecting against focused radiant energy beams which are used for military or other unfriendly destructive purposes. Thus, it is effective in neutralizing or counteracting the effectiveness of laser beams designed to penetrate and explode fuel tanks in various types of aircraft, guided missiles, land vehicles, and the like. It is also effective for inactivating radar beams which are used in defensive warning systems for detecting the presence of objects and personnel, and it is also effective against military offensive systems in which the radar is used in radar bombsights or radar proximity fuses, or to aim or guide missiles.

Although the invention is applicable to protection against many forms of radiant energy, the discussion herein will be directed, by way of example, to the deflection and scrambling of laser beams. The invention with respect to lasers is based in part on the determination that the expanded metal foil must be made from a non-ferrous metal having an absorptivity less than 3% and a thermal conductivity above about 100 W/m/K, such as aluminum, magnesium and copper. Although slit and expanded sheets may be made from a number of ferrous metals, such as steel, and other materials, such as acrylic plastics, and the like, such materials offer no resistance or retardation to the intense heat of a laser beam. Accordingly, a candidate deflection barrier made of such materials would be instantaneously melted and pierced before there was any opportunity to deflect or scatter the laser beam. It has been found that, in order to accomplish the deflection, the barrier material must be capable of causing the laser beam to dwell for a minimum period of time on the surface of the material before melting and piercing takes place.

The focused beam of a laser is capable of locally boiling and thereby piercing most metals if they are exposed to the laser beam for a sufficient length of time. As the metals are heated they become better absorbers and are thus more effectively heated to become even more absorptive and so on. This heating/increased absorption/ heating cycle causes immediate melting and piercing of the metal. However, the heating/increased absorption/heating cycle is difficult to set up in materials, such as aluminum, magnesium and copper, which are very highly reflective (i.e., possess very low absorptivity). These non-ferrous metals combine a high reflectivity (which inhibits laser input to the piercing zone) with a high thermal conductivity (which effectively cools the piercing zone). Although they could eventually be pierced by the laser, the piercing process is substantially slower in any practical range of laser power. Consequently, a dwell time is established by these materials, allowing them to survive for a period of time long enough to permit the angled surfaces of the expanded metal net to effectively deflect or scatter the focused laser beam.

It has been determined that, in order to provide the resistance to the laser beam necessary to be an effective deflecting agent, the non-ferrous metals should have an absorptivity of less than about 3% and a thermal conductivity above about 100 W/m/K. Absorptivity (%)=100 minus Reflectivity (%).

The product of the present invention therefore is a lightweight barrier for protection of an object against a focused beam of radiant energy, comprising a layer of slitted and expanded metal foil, made from a nonferrous metal having an absorptivity less than about 3% and a thermal conductivity above about 100 W/m/K, interposed between said object and said beam.

In one embodiment hereinafter described the barrier is placed in the form of a jacket or covering around the object to be protected. The barrier may be one or more sheets of slitted and expanded metal foil, or it may be a contained layer of nested ellipsoids formed from expanded metal sheets. For example, the layer of nested ellipsoids may be contained between two sheets of slitted and expanded metal foil.

In another embodiment, the invention is a fuel container which is jacketed with said layer of slitted and expanded metal foil, for protection against destruction from laser beams, and which is also filled with multiple pieces of expanded metal net formed in the shape of ellipsoids, for protection against internal explosion.

In another embodiment, a barrier layer of the type described above is incorporated in the outer shell or skin of an aircraft, missile, ground vehicle, and the like, to produce scrambling of radar beams and thus avoid radar detection or avoid destruction by weapons which are guided by radar beams.

In the preferred form of the invention, the barrier layer has a porosity in the range of 80 to 99% and a specific internal surface area above 250 square feet per cubic foot. This open-structured configuration not only produces a highly effective scattering of the focused laser or radar beams but it also provides significant flame arresting properties for additional protection of the shielded object.

The invention also comprises a method for protection of an article against a focused beam of radiant energy, comprising interposing between said article and said beam a layer of slitted and expanded foil, made from a non-ferrous metal having an absorptivity less than 3% and a thermal conductivity above 100 W/m/K.

BRIEF DESCRIPTION OF THE DRAWINGS

FIG. 1 is a cross-sectional view of a section of the barrier of the present invention, showing use of two sheets of expanded metal net.

FIG. 1-A is a cross-sectional view of a section of the barrier, showing a layer of ellipsoids contained between two sheets of expanded metal net.

FIG. 2 is a top view of a slitted metal foil sheet, which can be expanded by stretching to provide the expanded metal net usable in the present invention.

FIGS. 3 through 6 are top views of the expanded metal net, showing changes in configuration as the slitted sheet is pulled to open up the expanded metal net.

FIG. 7 is a perspective view showing the ellipsoid form made from the expanded metal net, for use in the present invention.

FIG. 8 is a side view of an aircraft external pylon fuel tank, with the barrier jacket of the present invention installed.

FIG. 9 is a cross-sectional end view of the pylon fuel tank, with the barrier jacket installed.

FIG. 10 is a cross-sectional end view of the pylon fuel tank, with the barrier jacket installed externally and with the inside of the tank filled with anti-explosion ellipsoids.

FIG. 11 is a perspective view showing a rectangular fuel tank from a ground combat vehicle, with the barrier jacket of the present invention in place.

FIG. 12 is a cross-sectional side view of the fuel tank of FIG. 11.

DETAILED DESCRIPTION OF THE INVENTION

Referring to the drawings, the basic structure of the barrier of the present invention is shown in FIG. 1, wherein the barrier 3 includes two layers 4 and 5 formed from expanded metal sheets made from a metal foil.

FIG. 1A shows the structure of the embodiment in which the barrier comprises a layer 6 of nested ellipsoids 7 contained between sheets 4 and 5 of expanded metal foil. Although not essential to the invention, it is desirable for certain purposes that the edges of sheets 4 and 5 be brought together and bound by stitching, stapling or other known fastening means at seams 8 and 9. The barrier may be square, rectangular, round, or any other shape to fit the configuration of the object which it is designed to protect.

The invention is not limited to the use of only two layers of expanded metal net, separated by a single core layer. In addition to its anti-laser and anti-radar effectiveness, the barrier also provides significant impact absorption and flame arresting properties, and for these purposes it may also be advantageous to employ three or four layers of metal net, separated by matching layers of nested ellipsoids. It is also useful in some environments to employ two or more sheets of metal net in contact with each other in a single layer.

The kind of metal used in the metal net should be any metal or metal alloy which is capable of being produced in a foil and which is not subject to instantaneous melting/destruction by a laser beam weapon. That is, the metal in a form of a slitted and expanded foil must offer sufficient resistance to the laser beam to cause the beam to dwell for a minimum period of time to enable the many disoriented surfaces of the metal net to diffuse or scatter the focused laser beam and thus cause the beam to lose its intense heating power before it reaches the surface of the fuel tank or other object being protected. Suitable metals are the non-ferrous metals which at ambient temperatures have an absorptivity less than 3% and a thermal conductivity above 100 W/m/K. These characteristics have been determined to make it difficult for the laser beam to establish the increased heating/increased absorption cycle necessary for melting and piercing of the metal, since the small amount of energy (<3%) absorbed at ambient temperatures is rapidly dissipated away from the laser/material interaction area as a result of the high (>100 W/m/K) thermal conductivity. Suitable metals include aluminum, magnesium and copper and alloys thereof with each other or with other metals such as zirconium, zinc, strontium, Rn(electron), silicon, titanium, iron, manganese, chromium or combinations thereof.

Aluminum is a particularly suitable material, not only because it has absorptivity and thermal conductivity properties within the above range (1-2% and 201 W/m/K, respectively), but also because it possesses a unique oxidation cycle which tends to produce an impervious $Al_2O_3$ seal on the surface of the laser/material interaction zone.

The expanded metal employed in producing the ellipsoids 7 and the sheets 4 and 5 is formed by slitting a continuous sheet of metal foil in a specialized manner and then stretching the slitted sheet to convert it to an expanded prismatic metal net having a thickness substantially greater than the thickness of the foil. Referring to the drawings, FIG. 2 shows a sheet of metal foil 10 provided with discontinuous slits appropriate for the present invention. The length and width of the sheet may be chosen from any number of practical dimensions, depending on the size of the barrier to be produced.

As noted in FIG. 2, sheet 10 is provided with discontinuous slits 11 in spaced apart lines which are parallel to each other but transverse to the longitudinal dimension of the sheet 10. The slits 11 in each line are separated by unslit segments or gaps 12, and it will be noted that the slits 11 in each line are offset from the slits 11 in adjacent lines. Similarly, the gaps 12 in each line are offset from the gaps 12 in adjacent lines. The lines of slits run perpendicular to the longitudinal edges 13 and 13A of the continuous sheet of metal foil. Methods and apparatus for producing the slitted metal foil are described in detail in U.S. Pat. No. 5,095,597, dated Mar. 17, 1992 and U.S. Pat. No. 5,142,735, dated Sep. 1, 1992.

When the slitted metal foil as shown in FIG. 2 is stretched by subjecting it to longitudinal tension, it is converted into an expanded metal prismatic net, usable as elements 4 and 5 of the present invention. In the stretching procedure, the horizontal surfaces of foil are raised to a vertical position, taking on a honeycomb-like structure. This conversion is shown in FIGS. 3 through 6 of the drawings. The slitted metal foil 10 is shown in FIG. 3 prior to stretching. When longitudinal tension is applied in the direction of arrow 15, the slits 11 begin to open and are converted to eyes 16, and the product assumes the appearance shown in FIG. 4. The application of more tension causes a greater opening of the slits, and the product expands into the honeycomb-like, prismatic form shown in FIG. 5. When even further tension is applied, the configuration reaches its desired end point, as in FIG. 6. The conversion illustrated in FIGS. 3 through 6 is accompanied by an increase in thickness of the product, the final thickness of the honeycomb product being approximately twice the value of the space 14 between each line of slits. Each eye of the expanded sheet has a three-dimensional structure having eight corner points.

The ellipsoids 7 are produced by cutting the expanded metal net sheets 4 or 5 into small segments which are then mechanically formed into small ellipsoids, as illustrated in FIG. 7. The ellipsoids 7 generally have a short diameter in the range of 20 to 40 mm, and a long diameter in the range of 30 to 60 mm, with the distance between focal points measuring approximately two-thirds of the long diameter of the ellipsoid. Their ellipsoid shape causes them to nestle closely together when placed in a contained position, so that complete surface coverage is obtained, with no gaps through which flames or beams can pass. Apparatus for producing these ellipsoids is described in detail in U.S. Pat. No. 5,207,756, date May 4, 1993.

For the barrier usage of the present invention, the thickness of the foil used to produce the metal net should be in the range between 0.028 and 1.0 mm, and the preferred thickness is between 0.2 and 1.0 mm. The length of each slit 11 is in the range between 1 and 2.5 cm, and the unslit sections or gaps 12 between each slit are in the range between 2 to 6 mm long. The distance 14 separating lines of slits may be varied but is ordinarily in the range between 1 and 4 mm, so that the thickness of the resulting expanded metal net is normally in the range between 2 and 8 mm. The preferred value for distance 14 is 2 to 4 mm.

FIGS. 8 and 9 illustrate an embodiment in which the barrier of the present invention is applied as a jacket around a combat aircraft external pylon fuel tank 18. Aircraft store fuel in all available locations, with the wing areas and rear fuselage the primary locations. In the embodiment shown, the barrier 3 is made up of two layers 4 and 5 of expanded metal sheets made from a metal foil, with a layer 6 of ellipsoids 7 contained therebetween. When this barrier is wrapped around the fuel tank in the form of a jacket, as shown, hostile laser beams directed at the tank from a distance are scattered and the integrity of the fuel tank is maintained intact.

FIG. 10 illustrates an embodiment in which the external pylon fuel tank of an aircraft is provided not only with an exterior jacket, as in FIGS. 8 and 9, but also with an interior filling of metal net ellipsoids. The interior filling serves a dual function, in that it not only supplements and reinforces the laser scattering effect of the exterior barrier jacket, but it also functions as a "passive inerting" system for prevention of ignition and explosion of fuel contents of the tank. In a tank which is completely filled in this manner, the ellipsoids occupy only about 0.4 to 1.1% of the volume of the tank, and the tank still has a remaining capacity of 98.9 to 99.6% for fuel. Such an arrangement eliminates the possibility of the fuel contents of the tank being ignited and exploded by a spark or projectile, because the metal net ellipsoids, with their high electrical conductivity (volume resistivity of <50 ohm-m), immediately conduct the heat of the spark away from the fuel vapor/oxygen mixture present in the tank.

Although this passive inerting of fuel tanks has been tested with other materials, such as reticulated plastic foam or aluminum net balls or batts, the ellipsoids of the present invention, because of their high specific internal surface area and porosity and because of their ellipsoid shape, provide an exceptionally effective fuel tank filler, which excels in terms of properties such as flame arresting, electrical conductivity, hydrolytic and thermal stability, protection against hydraulic ramming, the reduction of overpressure, protection against corrosion and contamination, and resistance to compacting. FIG. 10 thus illustrates an embodiment in which an aircraft fuel tank is protected both externally and internally against hostile laser beams and is also protected internally against explosion from piercing projectiles or sparks or ignition from other sources.

FIGS. 11 and 12 illustrate an embodiment in which the barrier of the present invention is applied to one of the fuel tanks of a ground combat vehicle. Ground vehicles used in the military utilize many different kinds of fuel tanks, made from a variety of materials, such as cast plastic, cast aluminum, cast steel, and the like. For example, the M1 Abrams tank series uses six cast plastic (polyethylene) fuel tanks, including two primary tanks, one on each side of the engine, two sponson tanks, and two secondary tanks, all of which are subject to rupture by a focused laser beam. In the embodiment shown, using one of these fuel tanks 17, the barrier 3 is made up of two layers 4 and 5 of expanded metal sheets made from a metal foil, with a layer 6 of ellipsoids 7 contained therebetween. When this barrier is wrapped around the fuel tank in the form of a jacket, as shown, hostile laser beams directed at the tank from a distance are scattered and the integrity of the fuel tank is maintained intact.

Another type of focused radiant energy beam which may be protected against by use of the present invention is the radar beam. As previously indicate, radar is used in early warning radar systems to help prevent surprise attacks by detecting enemy aircraft or ballistic missiles. Radar is also used to aim and fire guns and missiles, such as rockets. Bombers with radar bombsights drop bombs on targets at night or in bad weather. Especially damaging shells or bombs are equipped with radar proximity fuses, which explode the bombs in the air near a designated target. Anti-radar protection may be achieved by incorporating the barrier of the present invention in the outer shell or skin of the aircraft or ground or other vehicle to produce scattering of enemy radar beams and thus reduce or eliminate the vehicle's detectability, and thereby disable of the above-mentioned types of radar systems.

Since radar beams do not depend on heat generation for their effectiveness, it is not so essential that the expanded metal net be made from metals having the low absorptivity and high thermal conductivity that is useful in the diffusion of laser beams. However, the presence of such metals in a barrier for the outer shell or skin of vehicles or other objects is useful in situations where the dual anti-laser/anti-radar function may be necessary.

The anti-laser and anti-radar capability of the barriers of the present invention is achieved without adding any significant weight to the vehicle or other object being projected. The lightweight nature of the barrier pads of the invention is demonstrated in the following table showing the dimensions, weights and porosities of representative barrier pads within the scope of the invention:

TABLE 1

| PAD | PART No. | THICKNESS | | | WEIGHT (lb/ft$^2$) | | | POROSITY | | |
|---|---|---|---|---|---|---|---|---|---|---|
| | | Min | Med | Max | Min | Med | Max | Min | Med | Max |
| A | EF-1 | .079 | .079 | .079 | .036 | .036 | .036 | 98 | 98 | 98 |
| | EF-2 | .079 | .079 | .079 | .036 | .036 | .036 | 98 | 98 | 98 |
| | TOTALS | 1.6 | 1.6 | 1.6 | .072 | .072 | .072 | AVERAGE 98 | | |
| 1 | EF-1 | .079 | .079 | .079 | .036 | .036 | .036 | 98 | 98 | 98 |
| | EL-1 | 1.580 | 1.580 | 1.580 | .400 | .400 | .400 | 98 | 98 | 98 |
| | EF-2 | .079 | .079 | .079 | .036 | .036 | .036 | 98 | 98 | 98 |
| | TOTALS | 1.8 | 1.8 | 1.8 | .472 | .472 | .472 | AVERAGE 98 | | |
| 2 | FM-1 | .001 | .033 | .065 | .044 | .478 | .911 | 30 | 40 | 61 |
| | EF-2 | .158 | .158 | .158 | .072 | .072 | .072 | 98 | 98 | 98 |
| | EL-1 | 1.580 | 1.580 | 1.580 | .400 | .400 | .400 | 98 | 98 | 98 |
| | EF-3 | .079 | .079 | .079 | .036 | .036 | .036 | 98 | 98 | 98 |
| | EL-2 | 1.580 | 1.580 | 1.580 | .400 | .400 | .400 | 98 | 98 | 98 |
| | EF-4 | .079 | .079 | .079 | .036 | .036 | .036 | 98 | 98 | 98 |
| | FM-2 | .001 | .033 | .065 | .044 | .478 | .911 | 30 | 40 | 61 |
| | TOTALS | 3.5 | 3.5 | 3.6 | 1.032 | 1.90 | 2.77 | AVERAGE 97 | | |
| 3 | FM-1 | .001 | .033 | .065 | .044 | .478 | .911 | 30 | 40 | 61 |
| | EF-2 | .158 | .158 | .158 | .072 | .072 | .072 | 98 | 98 | 98 |

TABLE 1-continued

| PAD | PART No. | THICKNESS Min | Med | Max | WEIGHT (lb/ft²) Min | Med | Max | POROSITY Min | Med | Max |
|---|---|---|---|---|---|---|---|---|---|---|
| | EL-1 | 1.580 | 1.580 | 1.580 | .400 | .400 | .400 | 98 | 98 | 98 |
| | EF-3 | .079 | .079 | .079 | .036 | .036 | .036 | 98 | 98 | 98 |
| | EL-2 | 1.580 | 1.580 | 1.580 | .400 | .400 | .400 | 98 | 98 | 98 |
| | EF-4 | .079 | .079 | .079 | .036 | .036 | .036 | 98 | 98 | 98 |
| | EL-3 | 1.580 | 1.580 | 1.580 | .400 | .400 | .400 | 98 | 98 | 98 |
| | EF-5 | .079 | .079 | .079 | .036 | .036 | .036 | 98 | 98 | 98 |
| | FM-2 | .001 | .033 | .065 | .044 | .478 | .911 | 30 | 40 | 61 |
| | TOTALS | 5.1 | 5.2 | 5.3 | 1.47 | 2.34 | 3.20 | AVERAGE 97 | | |

LEGEND:
Min = Minimum
FM = Fine-mesh metal
Med = Median
EF = Expanded foil
Max = Maximum
EL = Ellipsoids
-x = Number of components
FG = Fiber glass It is a feature of the invention that the barrier pads possess a significantly high porosity which enable them to perform efficiently to disperse focused radiant energy beams, without eliminating their effectiveness to perform other functions such as impact absorbing and flame arresting. For the purposes of the present invention, the stratiform pads should have a porosity within the range of 80% to 99%. As indicated in Table 1, it is preferred that the porosity be about 96% to 99%.

The unique open network structure of the barriers of the invention provides an additional benefit in the form of a very high specific internal surface area, which enables the pads to operate effectively as flame arresters without interfering with their anti-laser or anti-radar capabilities. Pads such as those illustrated in Table 1 above have specific internal surface areas in the neighborhood of 320 square feet per cubic foot, which qualifies them as flame arresters for substantially all classes of fuels or flammable vapors. For the purposes of the present invention, the barrier pads should have a specific internal surface area at least as high as 250 square feet per cubic foot. In the practice of the invention, it is possible to achieve specific internal surface areas higher than 320 square feet per cubic foot, although for most practical purposes such higher areas are unnecessary.

Because of their foregoing unique properties and characteristics, the barrier pads of the present invention are effective not only in diffusing radiant energy beams such as laser, radar, electromagnetic radio waves, and the like, but also in providing flame arresting properties and protecting the jacketed articles of the invention against the impact of explosions.

Although preferred embodiments of the invention have been described herein in detail, it will be understood by those skilled in the art that variations may be made thereto without departing from the spirit of the invention.

What is claimed is:

1. A lightweight barrier for protection of an object against a focused beam of radiant energy, comprising a layer of slitted and expanded foil, made from a non-ferrous metal having an absorptivity less than 3% and a thermal conductivity above 100 W/m/K, interposed between said object and said beam.

2. A barrier as in claim 1 wherein said beam of radiant energy is a laser beam.

3. A barrier as in claim 1 wherein said beam of radiant energy is a radar beam.

4. A barrier as in claim 1 wherein said non-ferrous metal is aluminum or an alloy thereof.

5. A barrier as in claim 1 wherein said non-ferrous metal is magnesium or an alloy thereof.

6. A barrier as in claim 1 wherein said non-ferrous metal is copper or an alloy thereof.

7. A barrier as in claim 1 wherein said interposed layer has a porosity in the range of 80 to 99% and a specific internal surface area above 250 square feet per cubic foot.

8. A barrier as in claim 1 wherein said interposed layer comprises multiple sheets of said expanded metal foil.

9. A barrier as in claim 1 wherein said interposed layer is a contained layer of nested ellipsoids formed from said expanded metal sheets.

10. A barrier as in claim 9 wherein said nested ellipsoids are contained between layers of said expanded metal sheets.

11. A barrier as in claim 9 wherein the short diameter of said ellipsoids is in the range of 20 to 40 mm and the long diameter is in the range of 30 to 60 mm.

12. A fuel tank which is protected against the destructive rays of a laser beam weapon, said fuel tank comprising a container for said fuel and a jacket enveloping said container, said jacket comprising a layer of slitted and expanded foil made from a non-ferrous metal having an absorptivity less than 3% and a thermal conductivity above 100 W/m/K.

13. A fuel tank as in claim 12 wherein said non-ferrous metal is aluminum or an alloy thereof.

14. A fuel tank as in claim 12 wherein said non-ferrous metal is magnesium or an alloy thereof.

15. A fuel tank as in claim 12 wherein said non-ferrous metal is copper or an alloy thereof.

16. A fuel tank as in claim 12 wherein said jacket layer has a porosity in the range of 80 to 99% and a specific internal surface area above 250 square feet per cubic foot.

17. A fuel tank as in claim 12 wherein said jacket layer comprises multiple sheets of said expanded metal foil.

18. A fuel tank as in claim 12 wherein said jacket layer comprises a contained layer of nested ellipsoids formed from said expanded metal sheets.

19. A fuel tank as in claim 12 wherein said jacketed container is filled with multiple pieces of said expanded metal net formed in the shape of ellipsoids, for protection against explosion and for scattering focused beams of radiant energy.

20. A fuel tank as in claim 12, said fuel tank being located in an aircraft.

21. A fuel tank as in claim 12, said fuel tank being located in a guided missile.

22. A fuel tank as in claim 12, said fuel tank being located in a ground vehicle.

23. An article which is protected against detection by reflected radar waves, said article being covered by a layer of slitted and expanded metal foil for scattering said radar waves and preventing the return of true echoes, in which said metal is a non-ferrous metal having an absorptivity less than 3% and a thermal conductivity above 100 W/m/K.3.

24. An article as in claim 23 wherein said non-ferrous metal is aluminum or an alloy thereof.

25. An article as in claim 23 wherein said non-ferrous metal is magnesium or an alloy thereof.

26. An article as in claim 23 wherein said non-ferrous metal is copper or an alloy thereof.

27. The invention of claim 23 in which said article is a vehicle.

28. The invention of claim 23 in which said article is an air vehicle.

29. The invention of claim 23 in which said article is a land vehicle.

30. A method for protection of an article against a focused beam of radiant energy, comprising interposing between said article and said beam a layer of slitted and expanded foil made from a non-ferrous metal having an absorptivity less than 3% and a thermal conductivity above 100 W/m/K.

31. A method as in claim 30 wherein said non-ferrous metal is aluminum or an alloy thereof.

32. A method as in claim 30 wherein said non-ferrous metal is magnesium or an alloy thereof.

33. A method as in claim 30 wherein said non-ferrous metal is copper or an alloy thereof.

34. A method as in claim 30 wherein said beam of radiant energy is a laser beam.

35. A method as in claim 30 wherein said beam of radiant energy is a radar beam.

36. A method as in claim 30 wherein said interposed layer has a porosity in the range of 80 to 99% and a specific internal surface area above 250 square feet per cubic foot.

37. A method as in claim 30 wherein said interposed layer comprises multiple sheets of said expanded metal foil.

38. A method as in claim 30 wherein said interposed layer is a contained layer of nested ellipsoids formed from said expanded metal sheets.

39. A method as in claim 38 wherein said nested ellipsoids are contained between layers of said expanded metal sheets.

40. A method as in claim 38 wherein the short diameter of said ellipsoids is in the range of 20 to 40 mm and the long diameter is in the range of 30 to 60 mm.

* * * * *